Dec. 19, 1922.
T. M. PUSEY.
ELECTRIC REGULATOR.
FILED NOV. 4, 1920.
1,439,639.
2 SHEETS—SHEET 1.
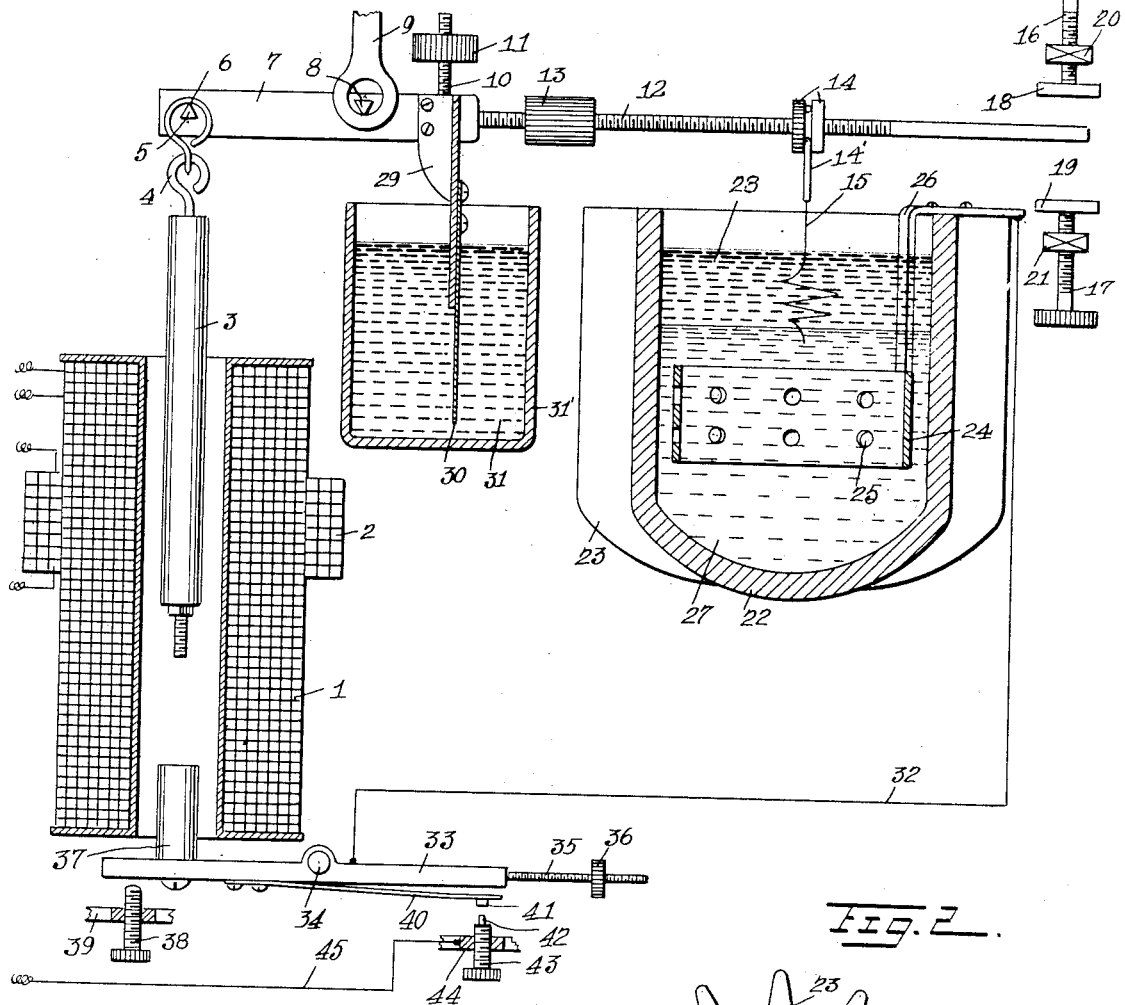
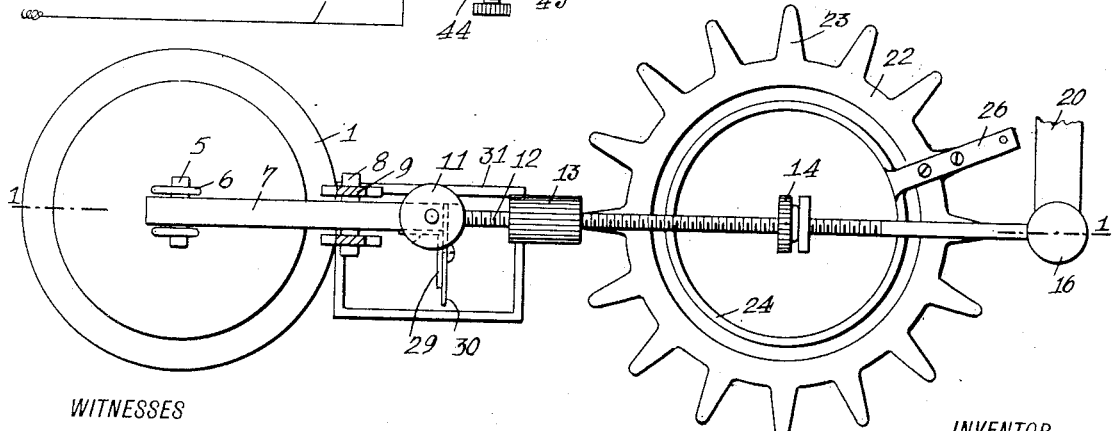
WITNESSES
H. T. Walker
Robert I. Hulsizer
INVENTOR
Thomas M. Pusey
BY Munn & Co
ATTORNEYS

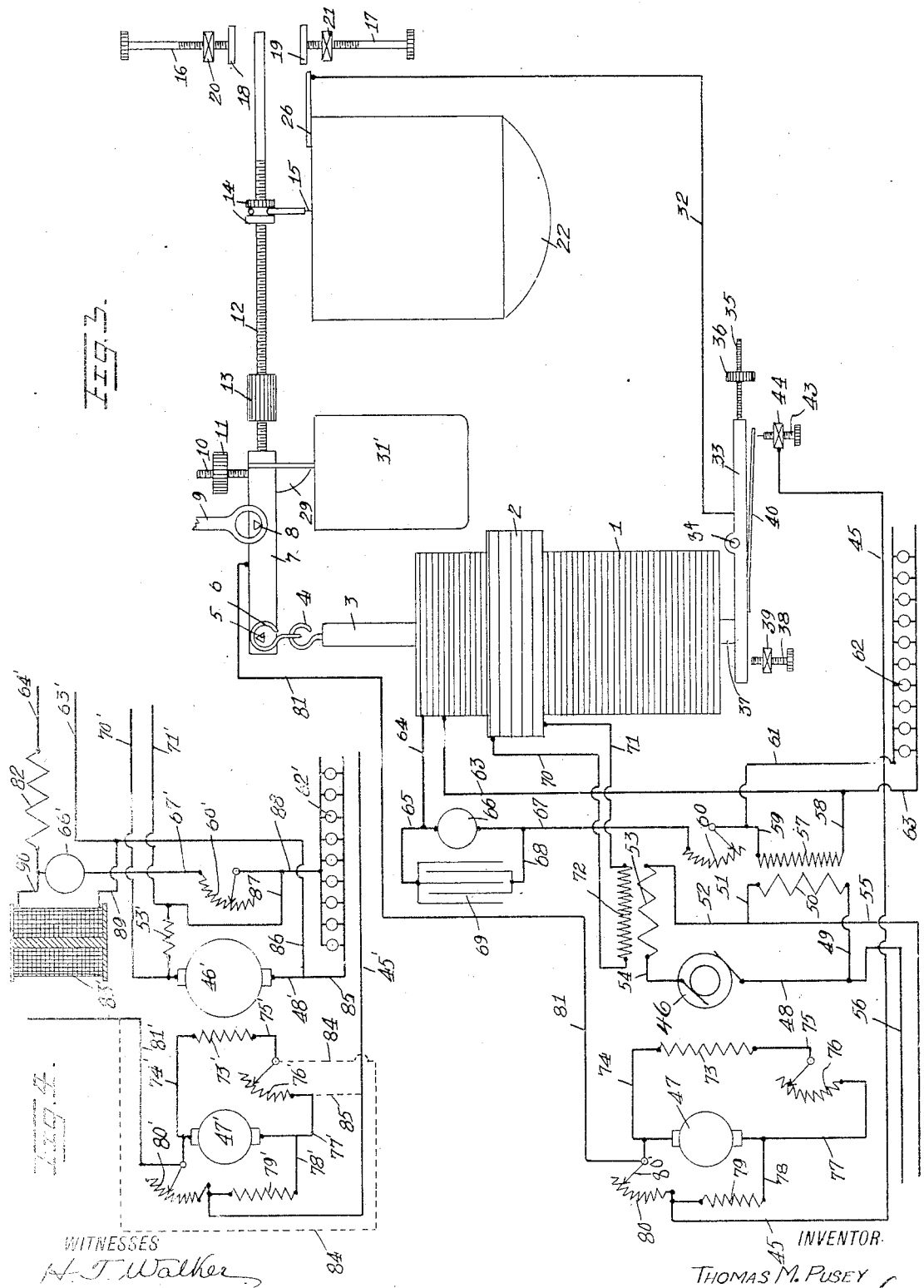

Patented Dec. 19, 1922.

1,439,639

UNITED STATES PATENT OFFICE.

THOMAS M. PUSEY, OF KENNETT SQUARE, PENNSYLVANIA.

ELECTRIC REGULATOR.

Application filed November 4, 1920. Serial No. 421,656.

*To all whom it may concern:*

Be it known that I, THOMAS M. PUSEY, a citizen of the United States, and a resident of Kennett Square, in the county of Chester and State of Pennsylvania, have invented a new and Improved Electric Regulator, of which the following is a full, clear, and exact description.

This invention relates to electric regulators, and has for an object the provision of a regulator designed to control the power furnished by the dynamo electric machine, whereby its regulation is effected in a very simple and efficient manner.

Another object resides in the provision of a regulator which responds quickly to variations in the electrical characteristics of the generator.

A further object resides in the provision of means whereby the sensibility of the regulator throughout the entire range of variation in the voltage of the machines under control is made uniform.

A still further object resides in the particular construction and arrangement of parts which will be hereinafter described and claimed and are shown in the accompanying drawings.

My invention, in general, comprises electro-magnetic means connected with a dynamo electric machine in such a way that a change in current or voltage of the machine under control will affect the electro-magnetic means and cause it to actuate certain mechanical elements and vary the amount of excitation received by the machine under control. My regulator is provided with a damping device whereby it responds variably to the magnetic influence in different directions. The regulator is further provided with adjustable means whereby the sensibility of the mechanism actuated by the electro-magnetic device can be varied at will. I also provide my electro-magnetic means with a circuit-opening device, so that when the electro-magnetic means is deenergized the controlling circuit is opened.

When this controller is used in connection with alternating current machines, I provide means whereby the control is uniform throughout a wide range of frequency. Correspondingly, with direct current machines I provide means whereby the control is uniform through a wide variation in the amount of current passing through the circuit.

The invention is illustrated in the drawings, of which:—

Figure 1 is a partial sectional view through certain parts of the apparatus;

Figure 2 is a plan view of the controller;

Figure 3 is a diagrammatic view showing the controller and the circuits connected therewith, particularly with respect to alternating current machines; and Figure 4 is a similar view with respect to direct current machines.

As shown in the drawings, my controller comprises a solenoid having a coil 1 thereon. This coil is adapted to be connected to respond to variations in voltage of the machine to be controlled. It is preferably made of a large number of turns of fine wire. Another coil 2, which is preferably made of a small number of turns of coarse wire, is placed around the coil 1 in any desired position and is connected to affect the controller in response to variations in the current passing through the machine under control. This solenoid is provided with a core or plunger 3 connected to a hook 4 with a clevis 6 adapted to connect it with a knife edge 5 on a rocker beam 7. The pivot point 8 of the beam 7 is a knife edge point and is supported from a beam 9 in any suitable manner. At any desired point a threaded rod 10 is connected to the beam 7. This rod is provided with a weight 11 which may be adjusted thereon to vary the sensibility of the beam 7 by varying its movement of inertia. The outer end of the beam 7 is in the form of a threaded bar 12 provided with an adjustable weight 13, which gives additional means for adjusting the sensibility of the beam 7 to vibration. Further out on the bar 12 are located a pair of threaded nuts 14 between which a loop of heavy wire 14′, preferably of copper, is clamped. This heavy wire, at its lower end, is connected in any suitable manner with a coil of fine wire 15, which may be of platinum. This coil is arranged in a spiral form with a sharp point on the end. The spiral is arranged in such manner that the end of the platinum wire near the outer end thereof is made smaller in diameter than the wire forming the rest of the spiral, so as to make as little surface as possible as compared with the length of that portion and thereby offer a small surface at or near the point of the spiral. This provision allows the spiral to have more or less movement without cutting in and out too much resistance.

The end of the threaded bar 12 is adapted to extend between a pair of bars 16 and 17 suitably threaded and provided on their inner adjacent ends with stops 18 and 19 with which the end of the bar 12 is adapted to contact. These bars 16 and 17 are suitably mounted on supports 20 and 21 in any desired manner. The stops 18 and 19 can be adjusted to limit the movement of the bar 12 in either direction. The spiral 15 is adapted to extend into a receptacle 22 which is provided with fins 23 for the purpose of radiating any heat formed. Within this receptacle a rectangular electrode 24 is placed and provided with apertures 25, permitting of a more efficient circulation therethrough of the electrolyte. This electrode 24 may be connected with the outside circuit in any suitable manner and supported within the vessel 22 by a bracket 26. The electrolyte is contained within the vessel 22 around the electrode 24, and is represented by the numeral 27. This electrolyte may be any alkaline solution containing such substances as potassium hydroxide or sodium hydroxide, which give the solution the proper amount of conductivity. A layer of some insulating substance, such as oil, 28 is disposed over the electrolyte, and this layer of oil tends to prevent the evaporation of the liquid electrolyte 27.

On the beam 7 adjacent the threaded rod 10 a plate 29 is fastened thereto. This plate, along its lower portion, is suitably connected to a resilient spring plate 30 adapted to extend downwardly into a bath of oil 31 contained in a suitable receptacle 31'. This plate 30 and the oil in the receptacle 31' act as a damper or dashpot arrangement to the movement of the associated parts. It will be noticed from Figure 1 that the plate 30 extends in contact with the plate 29 along a considerable portion of its surface but is only rigidly fastened thereto at its upper end by such means as the screws shown. Therefore, as shown in Figure 1, the plate 30, when the plate 29 moves to the left, will not offer as much resistance to this passage through the oil 31 as when the plate 29 moves to the right, the reason for this being that in the first instance the point around which this plate 30 would pivot would be the screws by which it is fastened to the plate 29, whereas, in the second instance, this point would be the lower end of the plate 29. This variation in the resiliency of the plate 30 with respect to different directions of its travel is for the purpose of damping the movement of the bar 12 more when the plunger 3 is drawn into the solenoid than when the plunger 3 tends to return to normal upon a decrease of the magnetic pull thereon.

The electrode 24 through its supporting bracket 26 is connected by wire 32 with a pivoted bar 33 mounted on a pivot 34. This bar 33 at one end is provided with a threaded rod 35 on which is disposed a weight 36 for the purpose of adjustment. The outer end of the bar 33 is provided with a core 37 which is adapted to be magnetically influenced by the solenoid and extends partially into the opening of the solenoid. Beneath this end of the bar 33 adjacent the solenoid a threaded stop pin 38 is suitably supported in a member 39. The other end of the bar 33 is provided with a spring 40 having a contact 41 thereon adapted to co-operate with a contact pin 42 on the outer end of the threaded rod 43 mounted in the plate 44. When the contacts 41 and 42 are abutting each other, a certain movement of the bar 33 is permissible without causing the separation of these contacts due to the resiliency of spring 40. A wire 45 extends from the plate 44 to one end of a rheostat, hereinafter to be mentioned.

As shown in Figure 3, the apparatus previously mentioned is adapted to be used in connection with the control of an alternating current machine 46 which is excited in any suitable manner by an exciting machine 47. One terminal of the machine 46 is connected by a wire 48 and a wire 49 with the primary 50 of the transformer. The other end of the primary 50 is connected by a wire 51 with a wire 52 which leads to one end of the primary 53 of another transformer and thence by a wire 54 to the other terminal of the machine 46. From the wire 52 a wire 55 extends to any suitable load, returning by wire 56 through one end of wire 48 above mentioned. The primary 50 of the transformer above mentioned is associated with the secondary 57 thereof which at one side is connected to a wire 58 and on the other side to a wire 59 leading to an adjustable rheostat 60. A wire 61 also extends from the wire 59 to a load 62, represented by a bank of lamps, returning therefrom through wire 63 connecting at one point to wire 58 and at another point to the solenoid coil 1. From this coil a wire 64 extends to a wire 65 and to a suitable resistance, such as a lamp 66, thence by wire 67 to the other side of the rheostat 60 previously mentioned. From the wire 67 a wire 68 leads to one side of a condenser 69, the other side of which is connected to the wire 64 by wire 65 previously mentioned. From one end of the solenoid coil 2 previously mentioned a wire 70 extends to one side of the secondary 72 of a transformer of which the primary 53 has already been mentioned. A wire 71 extends from the other side of this secondary 72 to the other end of the coil 2 on the solenoid. By reason of the fact that the condenser 69 will permit the passage of more current at high frequencies than at low frequencies, taken in connection with the fact that the coil 1 tends to resist the passage of current as the amount increases, these two characteristics tend to balance each other, whereby the current is maintained constant.

The field winding 73 of the machine 46 is connected at one end by a wire 74 with a terminal of the exciter 47 and at the other end to a wire 75 leading to an adjustable rheostat 76 and thence by wire 77 back to the other terminal of the exciter 47. A wire 78 leads from one terminal of the exciter 47 through a resistance 79 to one side of an adjustable rheostat 80, the other end of which is connected to the other side of the exciter 47. The arm 80' of the adjustable rheostat 80 is connected by a wire 81 with the rocker beam 7 previously mentioned. The other side of the adjustable rheostat 80 is connected with the wire 45 previously mentioned as extending from the plate 44.

In Figure 4 a modification of the circuit is shown as adapted for use in connection with direct current machines. In this instance the machine 46' is excited by an exciter 47'. This exciter 47' is not necessary for use in connection with machines of less than 50 to 100 kilowatts. In this case the wire 45' should be connected by the wire 85, shown in dotted line, and the wire 81' should be connected by wire 84 to the arm of the rheostat 76', as shown in dotted lines in Figure 4. This would allow the regulating device to control the voltage of the machine 46' without the use of the exciter 47', the action being the same.

In Figure 4 there is also shown an arrangement of resistances 66', 82 and 83' which is particularly adapted to cause the same amount of current to flow through the solenoid for the same voltage characteristic of the machine 46' regardless of the temperature of the solenoid and the associate resistances above mentioned. The adjustable resistance 60', the resistance 66', the resistance 82, and the solenoid coil 1 are in series with each other; whereas the resistance 83' is in parallel with the wire 63' and the wire 67'. The resistance 60' has a low coefficient of resistance. The resistance 66' has a high coefficient of resistance and is of a rapidly cooling nature. This resistance may preferably be a tungsten lamp. The resistance 83' has a high coefficient of resistance and is of a slowly cooling nature as compared with the resistance 66', but heats up and cools off in a manner similar to the coil 1 of the solenoid. It can be seen that since the resistance 82 is of low coefficient of resistance, that the solenoid coil 1 and the resistance 82 have together a lower coefficient of resistance than that of the resistance 83'. This being the case, when all three resistances, namely, 83', 82 and solenoid coil 1, are heated up, the resistance 83' allows less current to flow therethrough, due to the increased resistance, and thereby tends to cause the current to flow through the resistance 82, wire 64', solenoid coil 1, and wire 63'. Therefore, the total amount of current flow through the resistance 66' would be slightly decreased, and this tends to allow the resistance 66' to cool off somewhat, thus decreasing its resistance owing to its high coefficient of resistance, and this action tends to assist the resistance 83' in keeping the same amount of current flowing through solenoid coil 1 when the machine 46 is under a given voltage, regardless of the temperature of the various parts. The resistance 53', shown in Figure 4 in series with the upper terminal of the machine 46', is in the main circuit of the machine and is of a very low resistance, being just enough to divert some of the current through wire 70' and solenoid coil 2 so as to cause the coil 2 to increase the voltage of the machine 46' to compensate for the line drop in the main circuit.

It will be noticed that this controlling device is connected across the field rheostat of the exciting machine for both alternating and direct current equipment so as to cut out a part of the rheostat and to short circuit the rheostat, according to the amount of current required through the field of the exciter to maintain the voltage of the main machine up to the desired value.

The operation of this device when connected with an alternating current machine is briefly as follows and is represented in Figure 3 of the drawing: The current from the alternating machine 46 would pass through wire 54 and primary 53, wire 52 and wire 55 to the main circuit and is used up in the ordinary manner. A current will also pass from the wire 52 to wire 51, primary 50, wire 49, back to alternator 46. Under this condition, current passing through the primary 50 will energize the secondary 57 and cause the current to flow through the rheostat 60, wire 67, resistance 66, wire 64, through solenoid coil 1, back through wire 63, wire 58 to the other side of the secondary 57. The current in the main circuit flowing through the primary 53 will energize secondary 72 and cause current to flow through wires 70 and 71 to the solenoid coil 2. The energization of either coil 1 or coil 2 or both will cause a corresponding actuation of the plunger 3, which will rock the beam 7 and cause the spiral resistance wire 15 to be moved with respect to the electrolyte in the vessel 22. The energization of the solenoid coils 1 and 2 will also move the core 37, carrying with it the rocking beam 33 and causing the contacts 41 and 42 to immediately close the circuit previously mentioned.

If the voltage of the generator 46 should fall below normal this would cause less current to flow through solenoid 1, which would permit the plunger 3 to move out of the core under the influence of the weight on the oposite side of the beam 7. This causes the platinum spiral 15 to dip into the liquid and reduce the resistance in circuit, causing more current to flow from one side of the rheostat 80 of the exciting machine 47. This will cause the same current to flow around the rheostat 80 to the winding 79 of the field of the machine 47, thus completing the circuit. This will raise the voltage of the exciting machine 47 and cause more current to flow through the field winding 73 of the machine 46.

Whenever the spring 30 of the damper above mentioned is bent out of a straight line by the movement of the rocker beam 7, it will, by virtue of its elasticity, ass'st to bring the beam 7 back to a normal position and also the platinum spiral to a new predetermined position. On account of the action of the solenoid gaining more strength of pull on the core 3 with a given increase of voltage than the solenoid would lose in strength with the same given loss of voltage, I have provided, as previously mentioned, a different pivot length for the spring plate 30 according as it moves in one direction or another.

It will be apparent from a consideration of the operation thus far described and the mechanism above mentioned that when the machine 46 increases its voltage the core 3 is pulled into the solenoid, causing the resistance 15 to be withdrawn from the liquid, putting more resistance in circuit, and thereby reducing the excitation of the machine 47.

Whenever there is an increase or decrease in voltage of the machine under control, the movement of the rocker beam 7 in one direction or the other is momentarily permitted to a greater extent than otherwise might be the case, due to the fact that the damper mechanism, including the resilient plate 30 allows the beam to move momentarily a greater than normal distance on account of the resiliency of the spring plate 30. This, however, in straightening out tends to move the rocker beam back from this momentarily abnormal position whether the beam is moved in one direction or another. This extra movement is for the purpose of causing a greater or lesser amount of current to flow through the field of the exciter than would be necessary to maintain the system at a normal voltage. This is for the purpose of bringing the system back to normal voltage much quicker.

Whenever the circuit through the solenoid 1 is broken accidentally or otherwise, the armature 37 is allowed to descend, causing the breaking of the circuit through the contacts 41 and 42. By thus breaking the circuit at these points, a dangerous increase in voltage of the generator is prevented.

It will be apparent from a consideration of the above description that this device is adapted to effectively regulate voltage and current of either A. C. or D. C. machines in a simple and quick manner; it is especially sensitive and can be adjusted for a wide range of control. The damping device above mentioned is particularly adapted to restore the normal voltage as soon as possible after the change has taken place. It may be connected in series with the rheostat of the exciter circuit instead of in shunt therewith.

It will be apparent also that this device may be varied in many of its parts without departing from the spirit of the invention.

What I claim is:

1. A regulator for electric machines, comprising a solenoid affected by variations in voltage of the machine, a plunger actuated by the solenoid, a rocker beam actuated by the plunger, a liquid rheostat co-operating with the beam, and means for varying the sensitiveness of the beam to movement in different directions.

2. A regulator for electric machines, comprising a solenoid affected by variations in voltage of the machine, a plunger actuated by the solenoid, a rocker beam actuated by the plunger, a liquid rheostat co-operating with the beam, and means co-operating with the beam to make it more sensitive to movement in one direction than another.

3. A regulator for electric machines, comprising a solenoid affected by variations in voltage of the machine, a plunger actuated by the solenoid, a rocker beam actuated by the plunger, a rheostat co-operating with the beam, a resilient plate connected to the beam, and a body of liquid in which the resilient plate is adapted to move, said plate being constructed to offer less resistance to movement through the liquid in one direction than another.

4. A regulator for electric machines, comprising a solenoid affected by variations in voltage of the machine, a plunger actuated by the solenoid, a rocker beam actuated by the plunger, a rheostat co-operating with the beam, a depending plate on the beam, a resilient plate fastened at one end to said depending plate along one edge thereof and extending beyond the lower end of the depending plate, and a body of liquid in which the resilient plate is adapted to move, said resilient plate offering less resistance to movement through the liquid in one direction than another.

5. A regulator for electric machines, comprising a solenoid adapted to be energized by variations in the characteristics of the machine, a liquid rheostat, means actuated by the solenoid to vary the resistance through the rheostat, a pivoted lever, a core on said lever adapted to be actuated by the solenoid, a main line circuit, a main line contact on said lever adapted to be closed when the solenoid is energized, and means for maintaining said contact closed during minor movements of said lever due to minor variations of current through the solenoid.

6. A regulator for electric machines, comprising a solenoid, a pivoted lever, a core on said pivoted lever adapted to be actuated by said solenoid, a main line circuit, a spring on said lever, a main line contact on said spring, and an adjustable stationary contact co-operating with the contact on the spring whereby the main line circuit is closed during minor movements of said lever due to minor variations of current through the solenoid.

7. A regulator for electric machines, comprising a solenoid, a core, a pivoted lever adjacent the solenoid on one end of which said core is mounted, a flat spring disposed along the surface of the other end of said lever, the normal tendency of the spring being to be disposed slightly away from the lever, means maintaining contact carried on the end of said spring, an adjustable main line contact disposed adjacent the contact on the spring, and a main line wire connected to the lever, the contacts and the core being disposed so that the contacts are closed when the solenoid is energized and the circuit is kept closed by the action of the spring during minor movements of the lever.

THOMAS M. PUSEY.